Figure 3:
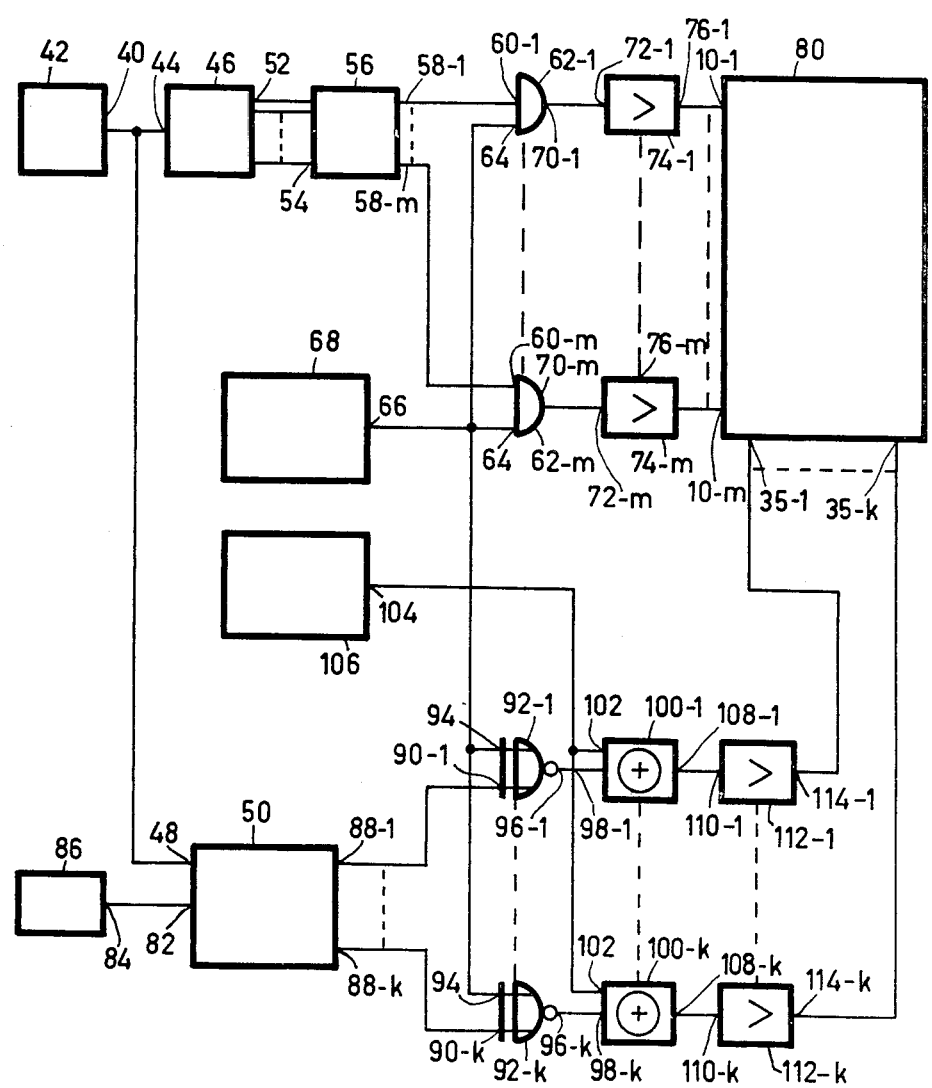

United States Patent [19]
van Doorn et al.

[11] 4,231,035
[45] Oct. 28, 1980

[54] LIQUID CRYSTAL DISPLAY FOR LARGE TIME MULTIPLEXING FACTORS

[75] Inventors: Cornelis Z. van Doorn; Jacobus J. M. J. DeKlerk, Eindhoven, both of Netherlands

[73] Assignee: U.S. Philips Corporation, New York, N.Y.

[21] Appl. No.: 953,325

[22] Filed: Oct. 20, 1978

[30] Foreign Application Priority Data

Oct. 27, 1977 [NL] Netherlands ............ 7711775

[51] Int. Cl.² ............................................. G06F 3/14
[52] U.S. Cl. ............................... 340/784; 350/346; 340/805
[58] Field of Search ............ 350/346 L; 340/765, 340/784, 805

[56] References Cited
U.S. PATENT DOCUMENTS

| | | | |
|---|---|---|---|
| 3,857,629 | 12/1974 | Freiser | 350/346 |
| 3,936,815 | 2/1976 | Kogure et al. | 350/346 |
| 3,984,343 | 10/1976 | Cole, Jr. et al. | 350/346 |
| 4,009,934 | 3/1977 | Goodwin et al. | 350/346 |
| 4,105,288 | 8/1978 | Geffken et al. | 350/346 |
| 4,119,558 | 10/1978 | Coates et al. | 350/346 |
| 4,119,842 | 10/1978 | Hayden et al. | 350/346 |

*Primary Examiner*—Marshall M. Curtis
*Attorney, Agent, or Firm*—Thomas A. Briody; Jack Oisher; Paul R. Miller

[57] ABSTRACT

A liquid crystal display screen of the twisted nematic type comprising a liquid crystal having a dielectric relaxation and a high dispersion of $\epsilon_{11}$ is used in a display device with a dual-frequency control. This structure enables the implementation of matrix-multiplex display devices having large pluralities of lines which must be successively scanned.

3 Claims, 3 Drawing Figures

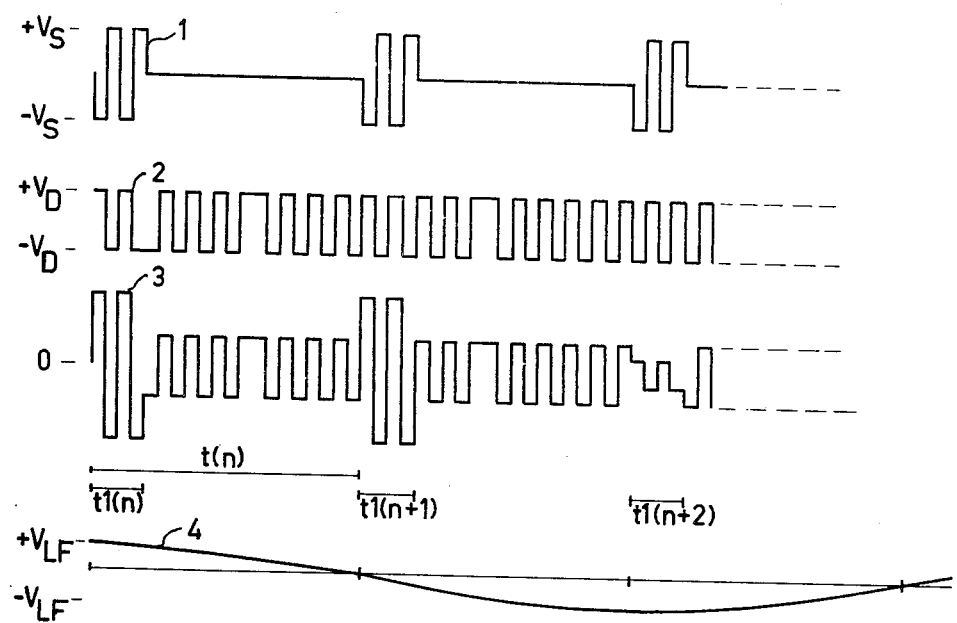
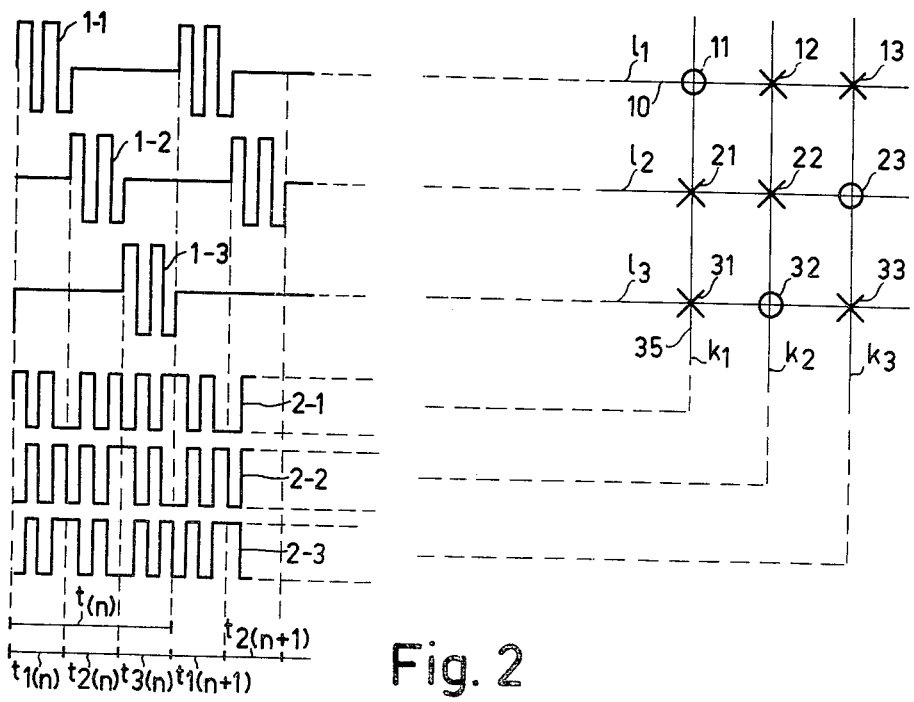

LIQUID CRYSTAL DISPLAY FOR LARGE TIME MULTIPLEXING FACTORS

The invention relates to a display device comprising a display screen having a plurality of display elements and an excitation circuit, the display screen comprising first and second cover plates and a liquid crystal, the cover plates together with the liquid crystal forming a twisted nematic type display screen, the first cover plate having a plurality of first electrodes at a side of the first cover plate facing the liquid crystal, the second cover plate having a plurality of second electrodes at a side of the second cover plate facing the liquid crystal and auxiliary optical means for making visible an orientation state of groups of molecules of the liquid crystal, the first and the second cover plate being substantially parallel to one another and coupled at their edges by sealing means for enclosing the liquid crystal between the cover plates and wherein a display element is constituted by a portion of the liquid crystal located between a portion of a first electrode and an opposite portion of a second electrode, the excitation circuit comprising a first generator for generating a high-frequency first AC voltage, a second generator for generating a low-frequency second AC voltage, a selection circuit for sequentially coupling the first generator to always at least one of the first electrodes, a control circuit for coupling the first generator to the second electrodes and a coupling circuit for continuously coupling all display elements to the second generator, wherein for a display element during the period of time in which the first electrode corresponding to this display element is coupled to the first generator, the AC voltage at the second electrode which corresponds to this same display element is controlled to be in phase with the AC voltage at the first electrode for adjusting a first orientation state of the molecules of the liquid crystal of this display element and to be out of phase for adjusting a second orientation state.

Such display devices are inter alia used for displaying alpha-numerical characters and other characters and/or figures for data processing equipment, wherein reading of the data is effected by means of optical auxiliary means such as polarizers, so that one of the orientation states of the molecules of a display element furnishes a dark image portion and the other orientation state furnishes a light image portion. In customary display devices reading can be effected both with incident light and with transmitted light, for which purpose at least one cover plate with the electrodes applied thereon is transparent.

A display device including a liquid crystal display screen is disclosed in the article by Alt and Pleshko, IEEE Transactions on Electron Devices, Vol. ED-21, No. 2, February 1974, pages 146 to 155 inclusive.

Page 152 and the following pages of the above-mentioned article describe a display device of the above-defined type which comprises a liquid crystal display screen of, for example, the field effect type. In the description of this display device two rms voltages $V_{off}$ and $V_{on}$ are defined on the basis of the static sensitivity curve of the display screen, during use of which the two possible orientation states of the molecules of the liquid crystal furnish the optical contrast which is at least required for reading. It appears that the maximum number m of the groups of display elements to be excited in time-division multiplex depends on the relative steepness of the sensitivity curve from which $V_{on}$ and $V_{off}$ have been derived, it being necessary to limit m to some dozens of groups to obtain a reasonable desired contrast.

It is an object of the invention to provide a display device wherein a high contrast is possible at very high values of m, even for display devices having a sensitivity curve of low relative steepness, without the necessity of very high drive voltages or a more complicated excitation circuit.

A display device according to the invention is therefore characterized in that the liquid crystal is of a type in which the liquid crystal has a dielectric relaxation, the difference between the dielectric constant in the average direction of the longitudinal axes of the molecules and the dielectric constant in a direction transverse thereto having, at the high frequency of the first AC voltage the opposite sign to the sign of this difference at the low frequency of the second AC voltage.

The surprising result is that the maximum value of m is no longer dependent on the chosen values of $V_{on}$ and $V_{off}$. Just as for the display device according to the above-mentioned article, the required amplitudes of the AC voltages increase by the value of m, so that ultimately the breakdown voltage of the display screen puts a practical limit to m, it appears that m may range from some hundreds to approximately a thousand which can be achieved with sufficiently low voltages. This enables display devices having a number of lines as customary for cathode-ray tube display devices of data processing apparatus, wherein characters having a $7 \times 9$ matrix in, for example, 40 textlines can be displayed, which requires at least $9 \times 40 = 360$ controllable lines.

In a display device according to the invention each molecule is subjected to three torques. This is, firstly, a mechanical torque resulting from a pre-treatment of the cover plates, so that the molecules, other torques not being present, will orient themselves substantially parallel to the cover plates with a twist, determined by the preliminary treatment of, for example, 90°, varying from the first to the second cover plate. A second torque is determined by the square of the rms. value of the low frequency AC voltage multiplied by the difference $\Delta \epsilon_L = \epsilon_{\parallel L} - \epsilon_{\perp L}$ and by the angle between the orientation of the electric field and the average orientation of the longitudinal axes of the molecules. For the low frequency the torque tries to adjust the molecules to an orientation in which the molecules are substantially parallel to the field direction, called the "ON"-state in the further course of this description. The third torque is determined by the square of the rms. value of the high-frequency a.c. voltage multiplied by the difference $\Delta \epsilon_H = \epsilon_{\parallel H} - \epsilon_{\perp H}$ and by the angle between the orientation of the electric field and that of the molecules. As $\Delta \epsilon_H$ has an opposite sign relative to $\Delta \epsilon_L$, this torque tries to orient the molecules transverse to the direction of the electric field. The orientation in which the third torque dominates will be called the "OFF"-state in the further course of this description.

As the high-frequency AC voltages are supplied in phase or in anti phase to the first electrode and the second electrode during the selection time in which the first electrode corresponding to a display element is coupled to the first generator, the average rms. value of the high-frequency AC voltage present across the display element can so be adjusted, depending on the information to be displayed, that the rms. value more or less compensates the rms. value of the low-frequency AC voltage.

In the most simple form $V_L$ is supplied to only one of the sets of electrodes, for example, only to all second electrodes, superimposed on the high-frequency AC voltage at these electrodes.

As only the rms. value plays a role, the shape of the AC voltages is of no importance, but square-wave voltages are frequently used in view of the use of digital circuits.

In view of the life of the display screen it is indesirable for the AC voltage to contain a d.c. component.

For achieving a good result many combinations of amplitudes of the different AC voltages are possible. An advantageous embodiment in which the voltages appear to be lowest possible on an average is constituted by a display device wherein the excitation circuit includes a time-division multiplexer for exciting the display elements each out of a plurality of m first electrodes corresponds to one out of m groups of display elements and the selection circuit is adapted to couple the first electrodes one at a time and in a cyclic sequence to the first generator, characterized in that the amplitude of the high-frequency AC voltage at a first electrode exceeds the amplitude of the high-frequency AC voltage at a second electrode by a factor substantially equal to the square-root of m.

The invention will now be described, by way of example, with reference to the accompanying drawings, wherein FIG. 1 illustrates by means of a time diagram the amplitudes and phases of the voltage supplied to the electrodes of a display element, FIG. 2 is a simplified time diagram for a connecting mode of a matrix-type display device having three rows and three columns; and FIG. 3 is a simplified block diagram of an excitation circuit according to the invention for exciting a matrix-type display device having m rows and k columns.

In FIG. 1 the first line denotes the a.c. voltage supplied to the first electrode. A plurality of cycles of the AC voltage of the highest frequency are periodically supplied to the first electrode during the cycle portions $t_{1(n)}$, $t_{(n+1)}$, etc. The second line denotes the AC voltage of the highest frequency as supplied to the second electrode and the third line denotes the voltage between the two electrodes, superpositioning with a signal of the lowest frequency not yet being effected. The fourth line denotes the AC voltage of the lowest frequency as this voltage appears between the electrodes. This AC voltage can be supplied by choice to the first or the second electrode or alternatively in anti-phase to both electrodes by means of known adder circuits for analog signals. In the drawing the AC voltages of the highest frequency are shown as square-wave voltages because these voltages can be formed most easily by means of logic switching elements, but this is not essential for the inventive idea.

In the example shown in the drawing the amplitude of the AC voltages at the first electrode have been chosen to be equal to $V_S$ which is symmetrical relative to ground, a condition also applying to the remaining voltages. This symmetry is desirable in view of the life of liquid crystals, which life can in some cases be markedly reduced owing to DC voltage components in the drive.

The amplitude $V_D$ of the AC voltage of the higher frequency at the second electrode is, in this example, smaller than $V_S$ and about equally large as the amplitude $V_{LF}$ of the AC voltage of the lower frequency between the electrodes.

During the first cycle portion $t_{1(n)}$ of a cycle $t_{(n)}$ the voltages, denoted by 1 and 2, are in antiphase and then the AC voltage 3 has an amplitude equal to $V_S+V_D$. In the remaining portion of the cycle $t_{(n)}$ the AC voltages 2 and 3 are equal to one another, because the AC voltage 1 is then equal to zero. The fact that the AC voltages 2 and 3 may change phase frequently in the remaining portion of the cycle $t_{(n)}$ is unimportant for the display element under consideration.

The rms. value $V_H$ of the AC voltage of the higher frequency, taken as an average over the cycle $t_{(n)}$, now exceeds $V_D$. With $t_1 = (1/m)t$ then $$V^2_{H(n)} = \frac{m-1}{m} \cdot V_D^2 + (V_S + V_D)^2 \cdot \frac{1}{m}$$

The same situation is obtained in the next cycle in which the voltages 1 and 2 have also opposite phases during $t_{1(n+1)}$.

In the next following cycle shown in the drawings the voltages 1 and 2 are of the same phase, so that voltage 3 now has the amplitude $V_S - V_D$.

So it now holds that:

$$V^2_{H(n+2)} = \frac{m-1}{m} \cdot V_D^2 + \frac{1}{m} \cdot (V_S - V_D)^2$$

At the chosen values of $V_{ON}$ and $V_{OFF}$, which correspond to $V_{on}$ and $V_{off}$ of the above-mentioned article, the voltages $V_S$, $V_D$ and $V_L$ are now chosen so that $$\Delta\epsilon_L \bar{V}^2_{ON} = \Delta\epsilon_H \left\{ \frac{m-1}{m} \cdot V_D^2 + \frac{1}{m} \cdot (V_S + V_D)^2 \right\} + \Delta\epsilon_L V_L^2$$

and $$\Delta\epsilon_L \bar{V}^2_{OFF} = \Delta\epsilon_H \left\{ \frac{m-1}{m} \cdot V_D^2 + \frac{1}{m} \cdot (V_S + V_D)^2 \right\} + \Delta\epsilon_L \bar{V}_L^2$$

If, for convenience, it is assumed that $$\Delta\epsilon = \Delta\epsilon_L = -\Delta\epsilon_H$$

then we find that $$V^2_{ON} = \frac{m-1}{m} \cdot (\bar{V}_L^2 - V_D^2) + [\bar{V}_L^2 - (V_S - V_D)^2]$$

$$V^2_{OFF} = \frac{m-1}{m} \cdot (\bar{V}_L^2 - V_D^2) + \frac{1}{m}[\bar{V}_L^2 - (V_S + V_D)^2]$$

from which it follows by means of subtraction that $$V^2_{ON} - V^2_{OFF} = \frac{4V_S V_D}{m}$$

and by adding that $$V_{ON}^2 + V_{OFF}^2 = \bar{V}_L^2 - V_D^2 - (1/m)V_S^2$$

For a given value for $V_L$ the solution of these two equations is given by $$\frac{V_D^2}{V_{ON}^2} = \tfrac{1}{2}(\frac{\overline{V_L}^2}{V_{ON}^2} - 1 - \tfrac{1}{2}\frac{V_{OFF}^2}{V_{ON}^2}) \pm$$

$$\tfrac{1}{2}\sqrt{(\frac{\overline{V_L}^2}{V_{ON}^2} - 1 - \tfrac{1}{2}\frac{V_{OFF}^2}{V_{ON}^2})^2 - \frac{m}{4}(1 - \frac{V_{OFF}^2}{V_{ON}^2})^2}$$

and $$\frac{V_S^2}{V_{ON}^2} = \tfrac{1}{2}m(\frac{\overline{V_L}^2}{V_{ON}^2} - 1 - \tfrac{1}{2}\frac{V_{OFF}^2}{V_{ON}^2}) \mp$$

$$\tfrac{1}{2}m\sqrt{(\frac{\overline{V_L}^2}{V_{ON}^2} - 1 - \tfrac{1}{2}\frac{V_{OFF}^2}{V_{ON}^2})^2 - \frac{m}{4}(1 - \frac{V_{OFF}^2}{V_{ON}^2})^2}$$

The lowest value of $V_L$ by means of which a solution is possible is given by $$(\frac{\overline{V_L}^2}{V_{ON}^2} - 1 - \tfrac{1}{2}\frac{V_{OFF}^2}{V_{ON}^2})^2 = \frac{m}{4}(1 - \frac{V_{OFF}^2}{V_{ON}^2})^2$$

or $$\frac{\overline{V_L}^2}{V_{ON}^2} = \tfrac{1}{2}(1 + \frac{V_{OFF}^2}{V_{ON}^2}) + \tfrac{1}{2}\sqrt{m}(1 - \frac{V_{OFF}^2}{V_{ON}^2})$$

therefore $$\frac{V_D^2}{V_{ON}^2} \tfrac{1}{2}\sqrt{m}(1 - \frac{V_{OFF}^2}{V_{ON}^2})$$

and $$\frac{V_S^2}{V_{ON}^2} = \tfrac{1}{2}m\sqrt{m}(1 - \frac{V_{OFF}^2}{V_{ON}^2})$$

Consequently, associated with this choice of $\overline{V_L}$ is $$V_S^2/V_{ON}^2 = m(V_D^2/V_{ON}^2)$$

and so $$V_S = \sqrt{m} \cdot V_D$$

Liquid crystals of the type used have a change-over frequency for which it holds that $\Delta\epsilon = 0$. This change-over frequency is usually in the order of magnitude of some kHz. Relative to this change-over frequency the low frequency must be chosen to be low, the high frequency to be high. For a liquid crystal having a change-over frequency of approximately 5 kHz good results were obtained with the low frequency being in the range of 50 Hz to 1 kHz and the high frequency in the range of 10 kHz to 1 MHz.

FIG. 2 shows diagrammatically a display device having 3×3 display elements. The lines 10 denoted by $l_1$, $l_2$ and $l_3$, respectively, represent the group conductors which interconnect the first electrodes of the display elements 11, 12, 13 and 21, 22, 23 and 31, 32, 33, respectively. The display elements are located where the lines 10 cross the lines 35 which represent the column conductors interconnecting the display elements 11, 21, 31 and 12, 22, 32 and 13, 23, 33, respectively. AC voltages of the higher frequencies are supplied to the first and second electrodes corresponding with the condition described in FIG. 1. For clearness' sake the supply of the AC of the lower frequency is not shown in the Figure.

A display pattern is schematically shown, by way of example, the display elements which must be ON being indicated by means of a circle and the display elements which must be OFF being indicated by means of a cross. Thus, in this example the display elements 11, 23 and 32 are assumed to be ON, the remaining elements to be OFF.

The voltages by means of which this is achieved are shown in the left hand portion. The lines 1-1, 1-2 and 1-3 indicate the AC 1 voltages such as they are supplied to the group conductors $l_1$, $l_2$ and $l_3$, respectively, the lines 2-1, 2-2 and 2-3 the AC voltages supplied to the column conductors $k_1$, $k_2$ and $k_3$, respectively.

During the cycle portion $t_1(n)$, the so-called line period of the display device, the voltages 1-1 and 2-1 are in phase for the display element 11, the effect of $V_{LF}$ is predominant and 1-1 is ON. During $t_{1(n)}$ the voltages 2-2 and 2-3 are of the opposite phase relative to 1-1 so that the display elements 12 and 13 are OFF. In the cycle portions $t_{2(n)}$ and $t_{3(n)}$ of the cycle $t_{(n)}$, the so-called picture period in which one complete picture is formed, the Figure shows that also the other display elements are excited in the proper manner.

In these cycle portions the voltage 1-1 is equal to zero and the phases of the voltages 2-1, 2-2 and 2-3 are in agreement with the phases desired for the display elements to be excited in a given cycle portion. As already indicated in the description of FIG. 1 this phase if of no importance for the elements 11, 12 and 13, and the figure shows for the described display element a random phase, that is to say random relative to that element.

In a similar manner excitation can be done by means of an excitation circuit having m lines and k columns, the excitation circuit scanning the m lines 10 one by one and supplying the k lines 35 with voltages as required for a given display pattern.

The integration time over which the rms AC voltages are average depends on properties inherent to the material of the liquid crystal. These integration times, which occur when a display element is excited, are of the order of magnitude of the natural decay time in the unexcited state of such a crystal. For display devices used for displaying, for example, alpha-numerical characters for data processing systems, much longer time constants are permissible as in these devices the display patterns do not change rapidly. Time constants of 100 msec or more may be used.

FIG. 3 shows a possible embodiment of an excitation circuit for a matrix display device or of a display device for figures or other characteristics, composed of segments, wherein each display element forms a segment and the display elements are connected in a matrix circuit, but mechanically need not, of necessity, be placed in a rectangular raster pattern.

In this excitation circuit an output 40 of a line oscillator 42 is coupled to an input 44 of a counting circuit 46 and an input 48 of a multiplex-circuit 50. For a matrix having m lines the counting circuit has at least m possible positions, which are each different from one another, and which can, for example, be decoded to a number of digital outputs 52, which number must be at least $^2\log m$ rounded upwards to an integer. The outputs 52 of the counting circuit are coupled to corresponding inputs 54 of a 1 out of m decoder circuit 56, having m outputs 58-1 to 58-m inclusive. Each output 58 is coupled to a corresponding first input 60 of the AND-gate circuits 62-1 to 62-m inclusive, all second inputs 64 being interconnected and together being coupled to an output 66 of a generator 68 for generating an a.c. voltage of the higher frequency. Each of the outputs 70-1 to 70-m inclusive are coupled to one input 72-1 to 72-m inclusive, respectively, of corresponding power amplifiers 74-1 to 74-m respectively, the outputs 76-1 to 76-m inclusive of which are connected to the group conductors 10-1 to 10-m inclusive of the display device 80. This section operates as follows. Line oscillator 42 supplies counting pulses in the desired scanning frequency to the counter 46 which, as a result thereof, successively passes in a cyclic sequence through positions which are different from one another. In a manner known per se, these counting positions are coded thus by the decoding circuit 56 that the outputs 58-1 to 58-m inclusive are successively excited one by one in a cyclic sequence. As a result thereof the first inputs 60-1 to 60-m inclusive of the AND-gate circuits 62-1 to 62-m inclusive are energized in the same sequence. During the energizing period $t_n$ of an AND-gate circuit 62-n (n=1, 2, ... m) the output 70-n of this AND-gate follows the pulse shape of the AC voltage generated by generator 68. The pulse train thus obtained is amplified by the excitation amplifier 74-n to the desired amplitude $V_S$, symmetrical relative to ground, this amplified voltage being supplied to the group conductor 10-n. As soon as and for the time a different AND-gate circuit 70 is energized the signal at the group conductor 10-n is equal to zero, in accordance with the representation of the simplified situation in accordance with FIG. 2.

A second input 82 of the multiplexer circuit 50 is coupled to an output 84 of a data processing unit 86. During each line period n the multiplexer circuit presents, in known manner, the binary information required for the display elements associated with the group conductor 10-n at the outputs 88-1 to 88-k inclusive which correspond to the column conductors 35-1 to 35-k inclusive of the display device 80. Each output 88 of the multiplexer circuit 50 is connected to one corresponding first input 90 of a plurality of NOT-Exclusive-OR-gates 92-1 to 92-k inclusive, the second inputs 94 of which are interconnected and coupled together to the output 66 of generator 68. A NOT-Exclusive-OR-gate 92 is energized when the inputs 90 and 94 of that gate 92 are both energized and when none of these two inputs are energized. The output 96 of a gate 92 consequently follows the shape of the AC voltage of the higher frequency of generator 68 and is in phase therewith if the associated input 90 is energized, and of the opposite phase if this input is not energized. Each output 96 is connected to a first input 98 of a corresponding state of the art analog adder circuit 100, whose second inputs 102 are interconnected and coupled together to an output 104 of a generator 106 for generating an AC voltage of the lower frequency. Each of the outputs 108 of the adder circuits is connected to one input 110 of a corresponding excitation amplifier 112, an output 114 of which is invariably connected to one corresponding column conductor 35.

In this portion of the excitation circuit the AC voltage of the lower frequency is superimposed on the AC voltage of the higher frequency and, after amplification, the sum is supplied to the second electrodes of the display elements of the display device 80.

If the information at the output 88-1 during the first cycle portion $t_{1(n)}$ is a "0", that is to say the input 90-1 is not energized, the high-frequency component of the AC voltage at the column conductor 35-1 is an antiphase to the high-frequency AC voltage at the group conductor 10-1 which, in that part of the period, is excited by a pulse train. In accordance with the description of FIG. 2 the display element which corresponds to the group conductor 10-1 and the column conductor 35-1 receives during $t_{1(n)}$ between the first and second electrodes an AC voltage having an amplitude $V_S+V_D$ and is thereby adjusted to the OFF-condition. If the information presented is a "1" then it follows in a corresponding manner that the display element is adjusted to the ON-condition. In a complete cycle $t(n)=t_{1(n)}+t_{2(n)}+ \ldots t_{i(n)}$ the complete desired display pattern is finally produced.

This embodiment of a display device according to the invention is, in no way, the only possible embodiment. For a person skilled in the art it is easy to see that, for example, the AC voltage of the lower frequency can be superimposed with a different arrangement of the elements on the AC voltages at the group conductors 10. Although the excitation circuit will generally be implemented by means of transistor circuits this is in no way characteristic of the inventive idea. In many cases the adder circuits and the associated excitation amplifiers will be combined into one circuit, which also applies to, for example, the adder circuit 46 and the one out of m decoder circuit 56. Alternatively, large sections of the excitation circuit can be combined to one or more integrated circuits.

Also the implementation of the multiplexer circuit and the coupling thereof to the other elements of the excitation circuit are only summarily indicated. Both the implementation and the coupling are affected by the nature in which the information to be displayed is available. Although no embodiment of the display device in accordance with the present invention has been described, any desired modifications thereof may be effected within the ability of a person skilled in the art and within the scope of the appended claims.

What is claimed is:

1. A display device comprising
  a liquid crystal display structure including a first cover plate, a liquid crystal having dielectric relaxation, a second cover plate, and sealing means for enclosing said liquid crystal between said first and second cover plate;
  a plurality of first electrodes disposed on said first cover plate at a side facing said liquid crystal, and a plurality of second electrodes disposed on said second cover plate at a side facing said liquid crystal;
  a plurality of display elements each formed by a portion of said liquid crystal located between a first electrode of said plurality of first electrodes and a second electrode of said plurality of second electrodes;
  auxiliary optical means for making visible orientation states of groups of molecules of said liquid crystal;
  first generating means for generating a high-frequency first AC voltage;
  second generating means for generating a low-frequency second AC voltage;
  selection circuit means for sequentially coupling said first generating means to always at least one of said first electrodes;
  control circuit means for coupling said first generating means to said second electrodes;
  coupling circuit means for continuously coupling all of said display elements to said second generating means; and
  means for controlling the AC voltage applied to one of said first electrodes at one of said display elements to be in phase with the AC voltage applied to said second electrode corresponding to said one display element so that a first orientation state of molecules of said liquid crystal is adjusted, while a second orientation state of said molecules is such that said AC voltage at said second electrode is out of phase with said AC voltage at said first electrode;

wherein the difference between the dielectric constant in the average direction of the longitudinal axes of the molecules and the dielectric constant in a direction transverse thereto has an opposite sign between said difference for said high frequency first AC voltage and that for said low frequency second AC voltage.

2. A display device according to claim 1, wherein a time-division multiplexer means is included for exciting each of a plurality of m first electrodes corresponding to m groups of display elements with an amplitude of high-frequency AC voltage applied to said first electrodes exceeding the amplitude of high-frequency AC voltage applied to said second electrodes by a factor substantially equal to the square root of m, and wherein said selection circuit means couples said first electrodes one at a time in a cyclic sequence to said first generating means.

3. A display device according to claim 1, wherein said coupling circuit means continuously couples said second generating means to said plurality of second electrodes.

* * * * *